United States Patent
Karame et al.

(10) Patent No.: US 9,609,000 B2
(45) Date of Patent: Mar. 28, 2017

(54) METHOD AND SYSTEM FOR EXECUTING A SECURE APPLICATION ON AN UNTRUSTED USER EQUIPMENT

(71) Applicant: NEC EUROPE LTD., Heidelberg (DE)

(72) Inventors: Ghassan Karame, Heidelberg (DE); Joao Girao, Ludwigshafen (DE)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 14/404,662

(22) PCT Filed: May 10, 2013

(86) PCT No.: PCT/EP2013/059742
§ 371 (c)(1),
(2) Date: Dec. 1, 2014

(87) PCT Pub. No.: WO2013/182376
PCT Pub. Date: Dec. 12, 2013

(65) Prior Publication Data
US 2015/0326584 A1 Nov. 12, 2015

(30) Foreign Application Priority Data

Jun. 6, 2012 (EP) .................................. 12171064

(51) Int. Cl.
*G06F 21/51* (2013.01)
*H04L 29/06* (2006.01)
(Continued)

(52) U.S. Cl.
CPC ............ *H04L 63/123* (2013.01); *G06F 21/51* (2013.01); *G06F 21/57* (2013.01); *G06F 21/64* (2013.01); *H04L 63/10* (2013.01)

(58) Field of Classification Search
CPC .......... G06F 21/52; G06F 21/51; G06F 21/57; G06F 21/64
See application file for complete search history.

(56) References Cited

U.S. PATENT DOCUMENTS 8,391,494 B1* 3/2013 Serenyi ............... H04L 63/0428
380/278
2007/0220500 A1* 9/2007 Saunier ................... G06F 21/51
717/162

(Continued)

FOREIGN PATENT DOCUMENTS

EP 1703430 A1 9/2006

OTHER PUBLICATIONS

Gu et al., "Remote Attestation on Program Execution", 2008, pp. 11-19.*

*Primary Examiner* — Kenneth Chang
*Assistant Examiner* — Thaddeus Plecha
(74) *Attorney, Agent, or Firm* — Leydig, Voit & Mayer, Ltd.

(57) ABSTRACT

A method for executing a secure application on an untrusted user equipment having storage means with at least one protected region includes establishing a secure or authenticated communication channel between a trusted device and the user equipment. Secure application information of the secure application is provided via the communication channel to be executed on the user equipment. Correctness of the secure application information is checked. Execution of the secure application is initiated on the user equipment via the communication channel such that the secure application is stored in the protected region of the storage means.

17 Claims, 2 Drawing Sheets

(51) Int. Cl.
G06F 21/57 (2013.01)
G06F 21/64 (2013.01)

(56) References Cited

U.S. PATENT DOCUMENTS

| | | | |
|---|---|---|---|
| 2008/0102793 A1* | 5/2008 | Ananthanarayanan | H04W 12/04 |
| | | | 455/411 |
| 2008/0178257 A1* | 7/2008 | Mishina ................. | H04L 9/088 |
| | | | 726/2 |
| 2008/0235140 A1* | 9/2008 | Read ............................... | 705/59 |
| 2009/0193522 A1* | 7/2009 | Ishikawa et al. ............... | 726/22 |
| 2010/0174900 A1* | 7/2010 | Lin ............................... | 713/155 |
| 2010/0303236 A1* | 12/2010 | Laaksonen ............ | H04L 63/062 |
| | | | 380/270 |
| 2010/0318798 A1 | 12/2010 | Binding et al. | |
| 2012/0266252 A1* | 10/2012 | Spiers ................ | H04L 63/0218 |
| | | | 726/26 |
| 2012/0331550 A1* | 12/2012 | Raj et al. ........................ | 726/22 |
| 2013/0103591 A1* | 4/2013 | Wheeler ........................ | 705/64 |
| 2013/0151848 A1* | 6/2013 | Baumann et al. ............ | 713/164 |
| 2013/0267199 A1* | 10/2013 | Kamal et al. ................. | 455/410 |
| 2014/0237255 A1* | 8/2014 | Martin et al. ................. | 713/182 |

* cited by examiner

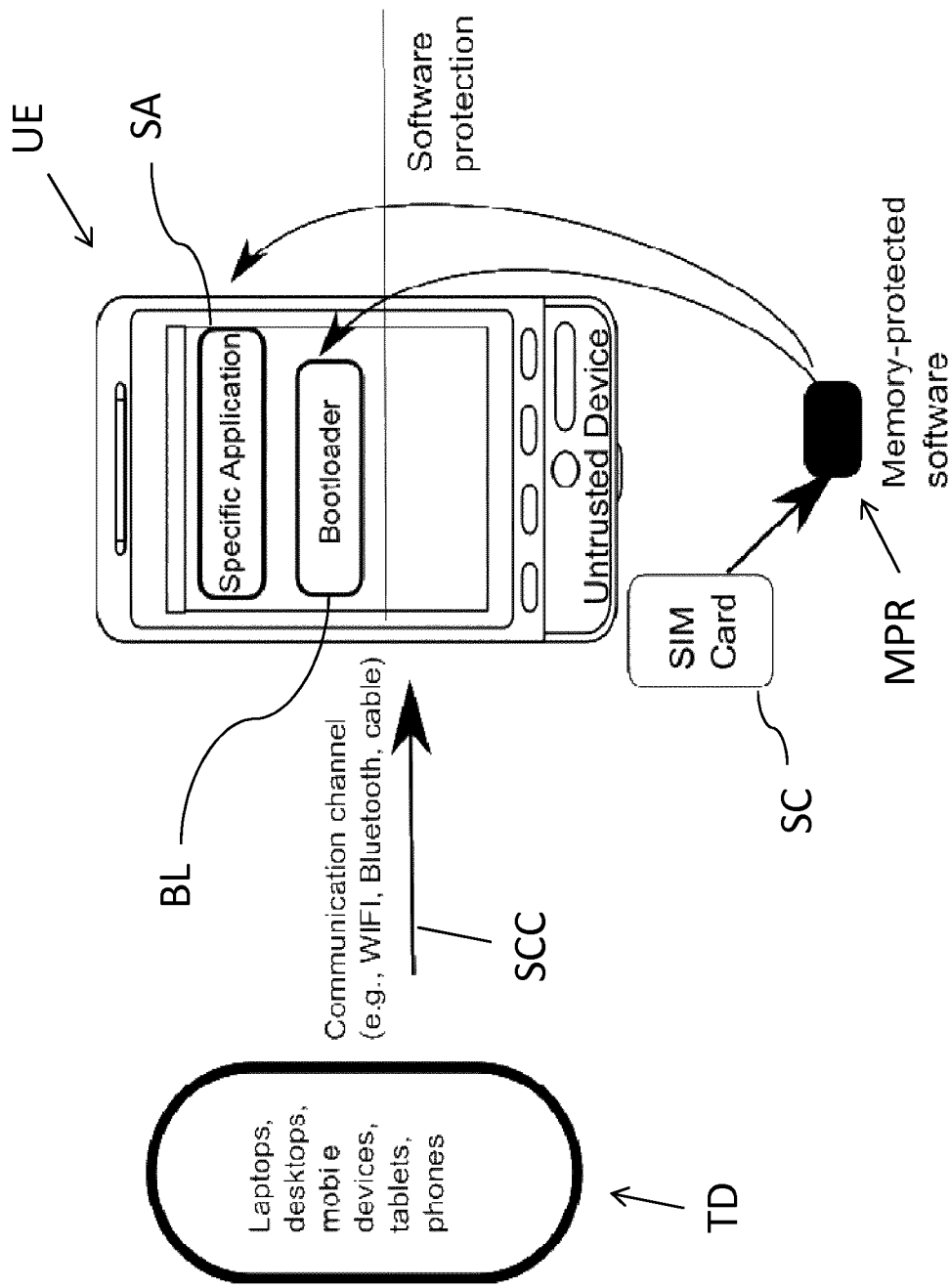

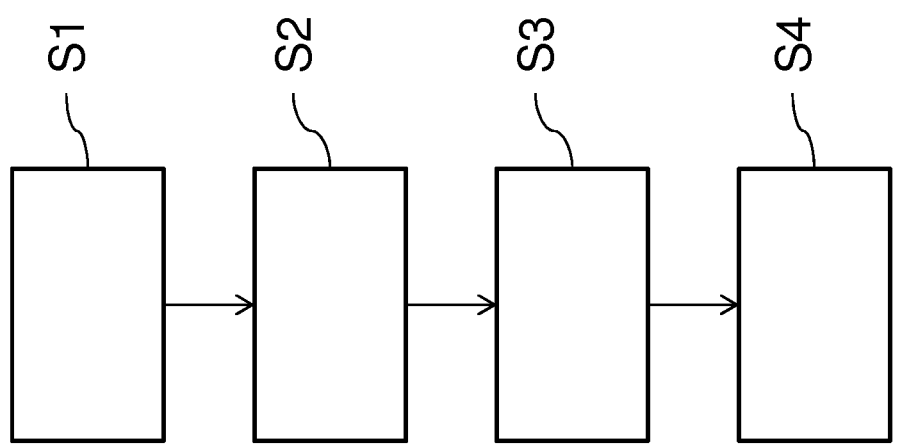

METHOD AND SYSTEM FOR EXECUTING A SECURE APPLICATION ON AN UNTRUSTED USER EQUIPMENT

CROSS-REFERENCE TO PRIOR APPLICATIONS

This application is a U.S. National Stage Application under 35 U.S.C. §371 of International Application No. PCT/EP2013/059742 filed on May 10, 2013, and claims benefit to European Patent Application No. EP 12171064.4 filed on Jun. 6, 2012. The International Application was published in English on Dec. 12, 2013 as WO 2013/182376 A1 under PCT Article 21(2).

FIELD

The present invention relates to a method for executing a secure application on an untrusted user equipment comprising storage means with at least one protected region.

The present invention further relates to a system for executing a secure application on an untrusted user equipment comprising storage means with at least one protected region.

Although applicable to user equipment or devices in general, the present invention will be described with regard to mobile phones as user equipment.

BACKGROUND

Remote attestation of untrusted devices is gaining increasing popularity. For example one side, such as a virtual private network client on a trusted device, proves that it is running in a secure environment to another side, such as a virtual private network server within the premises of a company network or the like. This may be achieved by recording the corresponding hardware environment, boot sequence or the like. Then the record sent to a third party to attest that the status of all hardware and software is secure, i.e. no malicious modification or the like is present. The data exchange may be encrypted by a trusted platform module being in charge of a cryptographic operation to ensure correction of the exchanged data.

To establish such a static root of trust and/or dynamic root of trust it was proposed to attest that an untrusted environment can provide some security guarantees and/or to create a trusted sub-environment within an untrusted computing environment. Further this is only applicable to static computing environments. To extend the application/operation of trusted computing to mobile computing environments it was proposed to embed trusted platform module chips within the mobile devices and establishing a root of trust within the mobile device itself, for example as mentioned in the non patent literature "Bootstrapping Trust in Commodity Computers.", of B. Parno, J. M. McCune, A. Perrig, IEEE S&P 2010, "OSLO: Improving the security of Trusted Computing", of Bernhard Kauer, Trusted Computing Group <<http://www.trustedcomputinggroup.org:>>, or of IBM 4758 Basic Services Manual: <<http://www-03.ibm.com/security/cryptocards/pdfs/IBM_4758_Basic_Services_Manual_Release_2_54.pdf.>>.

However, one of the drawbacks is, that additional space for such a trusted platform module within the mobile device is required and makes a mobile device more expensive.

Further it was proposed, for example as described the non patent literature of Kalman, G., Noll, J., UniK, K.: "SIM as secure key storage in communication networks", International Conference on Wireless and Mobile Communications (ICWMC) (2007), of Noll, J., Lopez Calvet, J. C., Myksvoll, K.: "Admittance services through mobile phone short messages", International Multi-Conference on Computing in the Global Information Technology. pp. 77-82. IEEE Computer Society, Washington, D.C., USA (2006) or of Mantoro, T., Milisic, A.: "Smart card authentication for Internet applications using NFC enabled phone" in International Conference on Information and Communication Technology for the Muslim World (ICT4M) (2010) to embed secret keys within the mobile phone SIM card as mean to authenticate a mobile device to external entities and/or to bootstrap a trusted computing base in the mobile device itself. However one of the drawbacks here is that SIM cards cannot fully mimic the functionality of existing trusting platform modules. In particular they do not support restricted operations on the platform configuration registers and can be cloned. A further disadvantage is that—due to the weakness in their key generation algorithms—their keys might also be brute-force searched.

SUMMARY

In an embodiment, the present invention provides a method for executing a secure application on an untrusted user equipment comprising a storage device with at least one protected region, the method comprising:
a) establishing at least one of a secure and an authenticated communication channel between a trusted device and the user equipment;
b) providing secure application information of the secure application via the communication channel to be executed on the user equipment;
c) checking correctness of the secure application information; and
d) initiating execution of the secure application on the user equipment via the communication channel, wherein the secure application is stored in the protected region of the storage device.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following:

FIG. 1 shows a method and a system according to an embodiment of the present invention; and FIG. 2 shows a method according to an embodiment of the present invention.

DETAILED DESCRIPTION

In an embodiment, the present invention provides a method and system for executing a secure application in an untrusted user equipment which provide an easy-to-implement static root of trust and/or dynamic root of trust extending from a trusted device to an untrusted user equipment which in particular does not have a trusted platform module.

In an embodiment, the present invention provides a method and a system for executing a secure application in an untrusted user equipment which provide application protection on the untrusted user equipment.

In an embodiment, the present invention provides a method and a system for executing a secure application in an untrusted user equipment enabling trusted platform module functionality across multiple physically disjoined user equipment.

In an embodiment, the present invention provides a method and a system for executing a secure application in an untrusted user equipment enabling dynamic integrity measurements.

In an embodiment, the present invention provides a method and a system for executing a secure application in an untrusted user equipment enabling flexibility, i.e. different degrees of protection.

According to an embodiment of the invention, a method for executing a secure application on an untrusted user equipment comprising storage means with at least one protected region is defined, the method comprising:
  a) a secure and/or authenticated communication channel is established between a trusted device and the user equipment;
  b) secure application information of the secure application is provided via the secure communication channel to be executed on the user equipment;
  c) correctness of the secure application information is checked; and
  d) execution of the secure application on the user equipment via the secure communication channel is initiated, wherein the secure application is stored in the protected region of the storage means.

According to another embodiment of the invention, a system for executing a secure application on an untrusted user equipment comprising storage means with at least one protected region is defined. The user equipment and a trusted device are operable to establish a secure and/or authenticated communication channel between them, and to exchange secure application information of the secure application via the secure communication channel to be executed on the user equipment and wherein the trusted device is operable to check correctness of the secure application information and to initiate via the secure communication channel execution of the secure application on the user equipment, wherein the secure application is stored in the protected region of the storage means on the user equipment.

According to an embodiment of the invention, it has been recognized that an easy implementation is enabled not requiring significant modifications to existing user equipment architectures: For example, by relying on a remote trust anchor the present invention enables trust, starting from higher layers in the application stack and attestation on the integrity of the user equipment application can be performed without, for example, requiring constant reboot of the user equipment.

According to an embodiment of the invention, it has been further recognized that in particular physically unclonable SIMcards are not necessary; conventional SIMcards may be used as storage means, thus reducing implementation costs.

According to an embodiment of the invention, it has been further recognized that remote attestation is enabled with full trusted platform module functionality. For example the correctness of applications running on a large number of user equipment being not necessary equipped with a trusted platform module can be attested/measured.

According to an embodiment of the invention, it has been further recognized that a trusted execution environment for applications an untrusted environment is enabled.

According to an embodiment of the invention, it has been further recognized that flexibility is enhanced since different degrees of protections against a wide range of attacker strengths are possible According to a preferred embodiment, a mobile network access means of the user equipment, preferably a SIMcard or SmartCard, is used for storing security and/or authentication information for the secure communication channel. By using mobile network access means, preferably a SIMcard, a SmartCard or the like, for storing security and/or authentication information the implementation can be provided more easily, since a mobile device with respectively a access means for a mobile network is provisioned in a user equipment anyway for accessing mobile networks; thus, no additional storage means have to be provided for storing the security and/or authentication information for the secure communication channel.

According to a further preferred embodiment, mobile network access means of the user equipment, preferably a SIMcard or SmartCard, is used for storing a measuring and/or checking application. This enables to store a measuring and/or checking application for checking correctness of the secure application information directly on the user equipment avoiding time consuming and cost-intensive transmission of the measuring and/or checking application from the trusted device to the user equipment or executing the measuring and/or checking application on the trusted device and transmit corresponding measuring and/or checking data between the user equipment and the trusted device.

According to a further preferred embodiment, the secure and/or authenticated communication channel is provided by a trusted physical connection, preferably a USB based cable connection, between the trusted device and the user equipment. With the use of a physical connection a cost intensive data transfer via a mobile network is avoided and the cable connection provides a connection which the user can check itself, whether the connection is secure or not.

According to a further preferred embodiment, a session key is transferred from the trusted device to the user equipment and the session key is used for establishing the secure and/or authenticated communication channel. This session key provides and easy and secure means to be used temporarily for establishing a secure and/or authenticated communication channel.

According to a further preferred embodiment, the secure and/or the authenticated communication channel is established by a secret key-challenge-response between the user equipment and the trusted device. This enables for example the use of public key/secret key sharing for establishing a secure and/or authenticated channel. For example first a pre-shared key is used between the trusted device and the untrusted user equipment. This key might serve to prove the authenticity of the untrusted user equipment and also to transfer integrity measurements to an application running on the trusted device. A secret key-challenge-response enables therefore a reliable establishment of a secure and/or authenticated communication channel.

According to a further preferred embodiment, step d) is performed by instructing a secure bootloader on the user equipment to load the secure application for execution. By using a bootloader, which is standard on a plurality of different types of user equipment for loading software, the flexibility is enhanced, since bootloaders on different user equipment can be used without having to take into account different architectures of the user equipment. For example standard bootloaders for different operating systems for a variety of different mobile phone manufactures may be used.

According to a further preferred embodiment, the secure bootloader launches a new environment for executing the secure application, preferably a virtual machine. This enables for example full isolation between executing environments: For instance each virtual machine can have its own resources, cache, disk allocation or the like. The user equipment may further disable direct memory access to the portion of the memory allocated to the virtual machine and prevent virtual machines form communicating to each other. Further the virtual machine and the running applications in the virtual machine may be extended on top of the platform configuration registers stored in the platform module of the trusted device. This enables an attestation of the integrity of the secure application running on the untrusted user equipment remotely and/or dynamically to remote parties.

According to a further preferred embodiment, the trusted device provides the secure application via the secure communication channel. This saves memory on the user equipment preferably in the protected region of the user equipment. Further updating the secure application is more easier on the trusted device and can be provided to a plurality of user equipment when needed.

FIG. 1 shows a method and a system according to a first embodiment of the present invention.

In FIG. 1 a trusted device TD, for example a laptop, desktop, a trusted mobile device, a table, or a phone establishes a secure communication channel SCC, for example via WIFI, Bluetooth or Cable to an untrusted user equipment UE. On the untrusted user equipment UE a boodloader BL is provided to load a specific secure application SA. The specific application SA is stored in FIG. 1 in a SIMcard SC for accessing a mobile communication network which comprises a memory protected region MPR in which a memory-protected software, in particular the secure application SA, is stored. Of course additionally or alternatively also a SmartCard can be used as storage means and/or mobile networks access means. The trusted device TD comprises a trusted platform module and this trusted platform module is then used as the main trust anchor for the entire system. The trusted platform module is used to measure respectively attest the correctness of applications running on the user equipment UE. The secure and authenticated channel SSC is used between the trusted device TD and the user equipment UE for it, i.e. the secure and authenticated channel SCC is used to transport measurements of the integrity of applications of the untrusted user equipment UE and may also be used to transport correct, respectively secure applications from the trusted device TD to the untrusted user equipment UE, respectively untrusted mobile device. The SIMcard SC of the untrusted user equipment UE is used to store cryptographic keys, measuring software and/or appropriate applications for integrity checks. Further the untrusted user equipment UE provides some degree of isolation respectively protections of the user equipments hardware, for example the CPU which has no access to memory-protected regions MPR.

In particular a static root of trust may be established on the trusted device TD to establish a secure boot. Secure boot means that only authorized applications can be executed. This may for example be realized by using the IBM integrity measurement architecture IMA. Further all applications may be measured starting from the so called core root of trust CRTM, measuring the BIOS of the trusted device TD, which measures the master boot record MBR, the boot loader, the kernel, and then specific applications. Among the attested applications, an interface application IA communicates with the untrusted user equipment UE via a secure and authenticated channel to transfer all required information and applications.

To establish a secure and authenticated channel between the interface application and for example a SIMcard of the untrusted user equipment UE, pre-shared keys between both entities are used. This pre-shared key first serves to proof the authenticity of the untrusted user equipment UE and is also used to transfer integrity measurements to the interface application IA on the trusted device TD. The interface application IA then issues a "START" command to initiate a key-challenge-response. The SIMcard issues then a challenge $C1=Enc_K(N||IDB)$, wherein Enc is semantically secure encryption function, N is a fresh nonce and IDB is a unique identifier of the SIMcard. The interface application IA then issues as response a command C2 to the SIMcard SC: $C2=Enc_K(START, N, IDA)$ wherein IDA denotes the unique identification of the interface application IA. Upon reception of this string, the SIMcard issues a command for the user equipment UE to load a secure bootlader BL that is originally stored on the memory-protected part MPR of the SIMcard SC. Alternatively the secure bootloader BL may be loaded from the interface application IA and cross-checked with a hash stored in the SIMcard SC.

For example, the bootloader BL then may launch a new environment, for example a new virtual machine, and fetches the secure application SA to be run from the SIMcard SC or alternatively from the interface application IA. Each environment may be fully isolated. For instance each virtual machine can have its own resources, cache, disks, allocation, etc. The user equipment UE may further disable direct memory access DMA to the portion of the memory allocated to the virtual machine and prevent virtual machines from communication with each other.

Further the attestation of the bootloader BL, the virtual machine and the running applications may be extended on top of the platform configuration registers stored in the trusted platform module of the trusted device TD. The integrity of the application running on the untrusted user equipment UE can be remotely and/or dynamically attested to further remote parties. Even further the user equipment UE may support multiple SIMcards SC. Therefore another option is to provide a modified SIM with encryption keys for example provided by a corporate environment.

When not using pre-sharing of keys between the interface application IA and the SIMcard SC a secure and authenticated channel may be established by connecting the untrusted user equipment UE by using a trusted cable, for example a USB cable, to communicate with the interface application IA. The interface application IA may then load a new temporary session key into the SIMcard SC. This may be performed if for example the interface application IA knows the PIN code of the SIMcard and this does not breach security, since the interface application IA is attested and executed in a trusted environment. This session key can then be used temporarily for establishing a secure and authenticated channel SCC as described above. The session key can be refreshed, for example when the user equipment UE by using a trusted cable is charged using the USB port of a personal computer.

FIG. 2 shows a method according to a second embodiment of the present invention.

In FIG. 2 a method for executing a secure application on an untrusted user equipment comprising storage means with at least one protected region is shown.

In a first step S1 a secure and/or authenticated communication channel is established between the trusted device and the user equipment.

In the second step S2 secure application information of the secure application is provided via the secure communication channel to be executed on the user equipment UE.

In a third step S3 correctness of the secure application information is checked and in a fourth step S4 execution of the secure application in the user equipment is initiated via the secure communication channel, when the secure application is stored in the protected region of the storage means.

In summary the present invention enables extending a static root of trust from one device equipment with a trusted platform module to another device that does not have a trusted platform module. Further the present invention provides an environment within the mobile device/user equipment to perform integrity measurements without the need for embedding a trusted platform module or the need to constantly restarting the user equipment. Even further the present invention enables use of a SIMcard for memory-protected integrity measurement checks.

The present invention further enables relying on the trusted platform module of one trusted device to extend the integrity of measurements on another untrusted device, leverages on a specific mobile architecture to achieve software/application protection and application isolation and utilizes a SIMcard for memory-protected integrity measurements checks.

The present invention has inter alia the following advantages. A sharing of the same trusted platform module functionality across multiple physically disjoined user equipment is enabled so that for example; a single trusted platform module can be used to attest/measure the correctness of an application running on a large number of user equipment that are not necessary equipped with a trusted platform module. Further the construction of a trusted execution environment within an untrusted environment is enabled provided that a certain degree of application isolation is provided, i.e. a limited set of applications running on the untrusted user equipment is correct and non-compromised is required.

Further new mobile device/user equipment architectures do not need to be designed for enabling integrity measurements from the "BIOS"-like level. Trust is however enabled by relying on a remote trust anchor starting from higher layers in the application stack. Attestation on the integrity of applications on the user equipment can be provided without requiring constant reboot of the user equipment. In other words, dynamic integrity measurements are supported and do not require significant modification to existing mobile device architecture/user equipment architectures. Even further one of the advantages is, that static root of trust measurements are extended that are typically performed using a trusted platform module device beyond the application layer. Even further the present invention provides the advantage, that the existence of physically unclonable SIM-cards is not necessarily required. A flexible architecture is also provided enabling enforcement of different degrees of protection against the wide range of attacker strengths. Even further an untrusted user equipment is enabled to proof the correctness of some of its applications to remote parties without relying on trusted platform modules or embedded secret keys within the mobile phone SIMcards, i.e. the storage means on the user equipment.

Many modifications and other embodiments of the invention set forth herein will come to mind the one skilled in the art to which the invention pertains having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for executing a secure application on an untrusted user equipment comprising a storage device with at least one protected region, the method comprising:
    a) establishing, between a trusted device and the user equipment, a communication channel being at least one of: a secure communication channel, and an authenticated communication channel, wherein the communication channel is established by performing a secret key-challenge between the user equipment and the trusted device;
    b) providing secure application information of the secure application via the communication channel to be executed on the user equipment;
    c) checking correctness of the secure application information; and
    d) initiating execution of the secure application on the user equipment via the communication channel such that the secure application is stored in the at least one protected region of the storage device,
    wherein the performing the secret key-challenge between the user equipment and the trusted device comprises issuing a challenge including a nonce and issuing a response to the challenge that also includes the nonce,
    wherein the issuing the challenge including the nonce comprises issuing, by the user equipment, the challenge including a semantically secure encryption function of the nonce and a unique identifier corresponding to the user equipment or a component of the user equipment, and wherein the issuing a response to the challenge that includes the nonce comprises issuing, by an interface application of the trusted device, a semantically secure encryption function of a START command, the nonce, and a unique identifier of the interface application.

2. The method according to claim 1, further comprising using a mobile network access device of the user equipment to store at least one of security and authentication information for the communication channel.

3. The method according to claim 1, further comprising using a mobile network access device of the user equipment to store at least one of a measuring and a checking application.

4. The method according to claim 1, wherein the communication channel is provided by a trusted physical connection between the trusted device and the user equipment.

5. The method according to claim 4, wherein a session key is transferred from the trusted device to the user equipment and the session key is used for establishing the communication channel.

6. The method according to claim 1, wherein step d) is performed by instructing a secure bootloader on the user equipment to load the secure application for execution.

7. The method according to claim 6, wherein the secure bootloader launches a new environment for executing the secure application.

8. The method according to claim 1, wherein the trusted device provides the secure application via the communication channel.

9. The method of claim 6, wherein a shared secret is used to initiate secure loading of the secure bootloader.

10. The method of claim 1 wherein the performing the secret key-challenge between the user equipment and the trusted device comprises, prior to the issuing the challenge including the nonce, issuing, by the interface application of the trusted device, the START command.

11. The method of claim 4, wherein the trusted physical connection between the trusted device and the user equipment is a USB cable.

12. The method of claim 1, further comprising loading, by the interface application of the trusted device, a temporary session key onto the storage device with the at least one protected region by using a trusted physical connection between the trusted device and the user equipment, wherein the temporary session key is used in establishing the communication channel by performing the secret key-challenge between the user equipment and the trusted device.

13. A system for executing a secure application on an untrusted user equipment comprising a storage device with at least one protected region, the system comprising:
a trusted device, wherein the user equipment and the trusted device are operable to:
establish, a communication channel being at least one of: a secure communication channel, and an authenticated communication channel, wherein the communication channel is established by performing a secret key-challenge between the user equipment and the trusted device;
exchange secure application information of the secure application via the communication channel,
check correctness of the secure application information, and
initiate, via the communication channel, execution of the secure application on the user equipment such that the secure application is stored in the at least one protected region of the storage device on the user equipment, wherein the performing the secret key-challenge between the user equipment and the trusted device comprises issuing a challenge including a nonce and issuing a response to the challenge that also includes the nonce, wherein the issuing the challenge including the nonce comprises issuing, by the user equipment, the challenge including a semantically secure encryption function of the nonce and a unique identifier corresponding to the user equipment or a component of the user equipment, and wherein the issuing a response to the challenge that includes the nonce comprises issuing, by an interface application of the trusted device, a semantically secure encryption function of a START command, the nonce, and a unique identifier of the interface application.

14. A method for executing a secure application on an untrusted user equipment comprising a storage device with at least one protected region, the method comprising:
a) establishing, between a trusted device and the user equipment, a communication channel being at least one of: a secure communication channel, and an authenticated communication channel, wherein the communication channel is established by performing a secret key-challenge between the user equipment and the trusted device;
b) providing secure application information of the secure application via the communication channel to be executed on the user equipment;
c) checking correctness of the secure application information; and
d) initiating execution of the secure application on the user equipment via the communication channel such that the secure application is stored in the at least one protected region of the storage device by instructing a secure bootloader on the user equipment to load the secure application, wherein the secure bootloader launches a new environment for executing the secure application, wherein the performing the secret key-challenge between the user equipment and the trusted device comprises issuing a challenge including a nonce and issuing a response to the challenge that also includes the nonce, wherein the issuing the challenge including the nonce comprises issuing, by the user equipment, the challenge including a semantically secure encryption function of the nonce and a unique identifier corresponding to the user equipment or a component of the user equipment, and wherein the issuing a response to the challenge that includes the nonce comprises issuing, by an interface application of the trusted device, a semantically secure encryption function of a START command, the nonce, and a unique identifier of the interface application.

15. The method of claim 14, wherein the new environment for executing the secure application is a virtual machine, and
wherein the virtual machine has at least one of: resources, a cache, and a disk allocation.

16. The method of claim 15, further comprising disabling, by the user equipment, direct memory access to a portion of a memory allocated to the virtual machine.

17. The method of claim 15, wherein a measurement of the virtual machine and the secure application is extended on top of platform configuration registers stored in a platform module of the trusted device to enable an attestation of an integrity of the secure application.

\* \* \* \* \*